United States Patent
Xin

(10) Patent No.: US 11,295,035 B2
(45) Date of Patent: Apr. 5, 2022

(54) APPLICATION FREEZING MANAGEMENT METHOD, DEVICE AND TERMINAL

(71) Applicant: YULONG COMPUTER TELECOMMUNICATION SCIENTIFIC (SHENZHEN) CO., LTD., Shenzhen (CN)

(72) Inventor: Zhe-Xin Xin, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 448 days.

(21) Appl. No.: 16/321,125

(22) PCT Filed: Aug. 27, 2016

(86) PCT No.: PCT/CN2016/097054
§ 371 (c)(1),
(2) Date: Jan. 28, 2019

(87) PCT Pub. No.: WO2018/018695
PCT Pub. Date: Feb. 1, 2018

(65) Prior Publication Data
US 2019/0171831 A1 Jun. 6, 2019

(30) Foreign Application Priority Data
Jul. 29, 2016 (CN) .......................... 201610619709.9

(51) Int. Cl.
*G06F 21/62* (2013.01)
*G06F 21/31* (2013.01)
(Continued)

(52) U.S. Cl.
CPC ............ *G06F 21/629* (2013.01); *G06F 9/485* (2013.01); *G06F 21/31* (2013.01); *G06F 21/32* (2013.01);
(Continued)

(58) Field of Classification Search
CPC .... G06F 21/31; G06F 21/629; G06F 21/6245; G06F 9/485; G06F 21/32;
(Continued)

(56) References Cited

U.S. PATENT DOCUMENTS

| 2015/0134700 A1* | 5/2015 | Macklem | G06F 21/604 707/781 |
| 2015/0160976 A1* | 6/2015 | Kim | G06F 9/4881 718/108 |
| 2017/0339265 A1* | 11/2017 | Kumar | H04W 52/0251 |

FOREIGN PATENT DOCUMENTS

| CN | 101923382 A | 12/2010 |
| CN | 103744681 A | 4/2014 |

(Continued)

*Primary Examiner* — Beemnet W Dada
(74) *Attorney, Agent, or Firm* — ScienBiziP, P.C.

(57) ABSTRACT

An application freezing management method, a device and a terminal are provided, and the method includes: acquiring at least one application freezing condition. Corresponding application unfreezing strategies for the application freezing conditions is configured, and a mapping relation between the corresponding application freezing conditions and the application unfreezing strategies is generated. Thus different application unfreezing strategies can be configured for different application freezing conditions according to actual acquirements of user, the user's individualized requirements can be satisfied, diversities of the application unfreezing strategies and practicality of the application freezing management are improved, and user experience is improved.

15 Claims, 5 Drawing Sheets

(51) Int. Cl.
*H04M 1/72403* (2021.01)
*G06F 9/48* (2006.01)
*G06F 21/32* (2013.01)
*H04M 1/72463* (2021.01)

(52) U.S. Cl.
CPC .... *G06F 21/6245* (2013.01); *H04M 1/72403* (2021.01); *G06F 2221/2111* (2013.01); *H04M 1/72463* (2021.01)

(58) Field of Classification Search
CPC ............ G06F 2221/2111; G06F 21/36; H04M 1/72403; H04M 1/72463
See application file for complete search history.

(56) References Cited

FOREIGN PATENT DOCUMENTS

| | | |
|---|---|---|
| CN | 104317608 A | 1/2015 |
| CN | 105468426 A | 4/2016 |

\* cited by examiner

APPLICATION FREEZING MANAGEMENT METHOD, DEVICE AND TERMINAL

CROSS-REFERENCE TO RELATED APPLICATIONS

This application claims priority of Chinese Patent Application No. 201610619709.9, entitled "APPLICATION FREEZING MANAGEMENT METHOD, DEVICE AND TERMINAL" filed on Jul. 29, 2016 in the China National Intellectual Property Administration (CNIPA), the entire contents of which are incorporated by reference herein.

FIELD

The present disclosure relates to a technical field of terminal, specifically an application freezing management method, a device and a terminal.

BACKGROUND

At present, in existing application unfreezing solutions, terminals generally directly unfreeze application or unfreeze the applications by a single unfreezing manner. However, it is found in practice that the former manner does not consider securities when unfreezing the applications, and each user can unfreeze frozen applications in the terminal and then use the unfreezed applications, privacy information of the user may be leaked out. The latter one, which chooses the single unfreezing manner, such as a fingerprint, a digital password, a Sudoku, voice and the like. These unfreezing manners are simple, and does not consider actual requirements of terminal applications, such as property applications with relatively high security requirements. In order to prevent some lawbreakers from easily cracking the application to steal user privacy information and causing property damage, therefore, it is necessary to apply a safer unfreezing method to the property applications.

SUMMARY

Technical problems to be solved by the embodiment of the present disclosure are to provide an application freezing management method, a device and a terminal, to improve diversities of application freezing management.

One aspect of an embodiment of the present disclosure provides an application freezing management method, which includes:

Acquiring at least one application freezing condition, and the application freezing condition including at least one of a time condition, a type condition, an environmental condition and a setting condition;

Configuring corresponding application unfreezing strategies for the application freezing conditions, different application freezing conditions corresponding to different application unfreezing strategies;

Generating a mapping relation between the corresponding application freezing conditions and the application unfreezing strategies, according to the application freezing conditions and the application unfreezing strategies.

Optionally, after generating the mapping relation between the corresponding application freezing conditions and the application unfreezing strategies, according to the application freezing conditions and the application unfreezing strategies, the method further includes:

When receiving an unfreezing instruction for a target application, determining a target freezing condition corresponding to the target application;

Searching for a target unfreezing strategy corresponding to the target freezing condition from the generated mapping relation between the application freezing conditions and the application unfreezing strategies;

Unfreezing the frozen target application according to the target unfreezing strategy.

Optionally, configuring corresponding application unfreezing strategies for the application freezing conditions, includes:

Configuring at least one corresponding application unfreezing password for each condition of the application freezing conditions, the application unfreezing password including at least one of a character unfreezing password, an image unfreezing password and a voice unfreezing password;

Arranging and combining the application unfreezing passwords to obtain the application unfreezing strategies corresponding to the application freezing conditions, according to preset password priorities and combined logic relations.

Optionally, after generating the mapping relation between the corresponding application freezing conditions and the application unfreezing strategies, according to the application freezing conditions and the application unfreezing strategies, the method further includes:

Receiving a creation request, the creation request being used to request to create a relationship comparison table corresponding to the mapping relation between the application freezing conditions and the application unfreezing strategies;

Responding to the creation request, and creating the corresponding relationship comparison table, the application freezing conditions and the application unfreezing strategies being arranged in the relationship comparison table according to preset information priorities.

Optionally, the method further includes:

Updating or regenerating the mapping relation between the application freezing conditions and the application unfreezing strategies, when the application freezing conditions are detected or the application unfreezing strategies change.

Another aspect of an embodiment of the present disclosure provides an application freezing management device, which includes:

An acquisition module, configured to acquire at least one application freezing condition, and the application freezing condition including at least one of a time condition, a type condition, an environmental condition and a setting condition;

A configuration module, configured to configure corresponding application unfreezing strategies for the application freezing conditions, different application freezing conditions corresponding to different application unfreezing strategies;

A generation module, configured to generate a mapping relation between the corresponding application freezing conditions and the application unfreezing strategies, according to the application freezing conditions and the application unfreezing strategies.

Optionally, the device further includes:

A determination module, configured to, when receiving an unfreezing instruction for a target application, determine a target freezing condition corresponding to the target application;

An search module, configured to search for and determine a target unfreezing strategy corresponding to the target freezing condition, according to the mapping relation between the application freezing conditions and the application unfreezing strategies generated by the generation module;

An unfreezing module, configured to unfreeze the target application according to the target unfreezing strategy.

Optionally,

The configuration module, specifically configured to configure at least one corresponding application unfreezing password for each condition of the application freezing conditions, the application unfreezing password including at least one of a character unfreezing password, an image unfreezing password and a voice unfreezing password; arrange and combine the application unfreezing passwords according to preset password priorities and combined logic relations, to obtain the application unfreezing strategies corresponding to the application freezing conditions.

Optionally, the device further including:

A receiving module, configured to receive a creation request, the creation request being used to request to create a relationship comparison table corresponding to the mapping relation between the application freezing conditions and the application unfreezing strategies;

A creation module, configured to respond to the creation request, and create the corresponding relationship comparison table;

An arranging module, configured to arrange and display the application freezing conditions and the application unfreezing strategies according to preset information priorities in the relationship comparison table.

Optionally, the device further includes:

An updating module, configured to update or regenerate the mapping relation between the application freezing conditions and the application unfreezing strategies, when the application freezing conditions are detected or the application unfreezing strategies change.

Another aspect of an embodiment of the present disclosure provides a terminal, the terminal includes the application freezing management device.

BRIEF DESCRIPTION OF THE DRAWINGS

In order to more clearly illustrate the embodiments of the present disclosure or the technical solutions in the prior art, the drawings used in the embodiments or the prior art description will be briefly introduced below. Obviously, the drawings in the following description are only some embodiments of the present disclosure, and those skilled in the art can obtain other drawings from these drawings without any creative work.

DETAILED DESCRIPTION

In order to enable those skilled in the art to better understand the solution of the present disclosure, the technical solutions in the embodiments of the present disclosure will be described below with reference to drawings in the embodiments of the present disclosure. Obviously, described embodiments are merely embodiments which are a part of the present disclosure, rather than every embodiment. All other embodiments obtained by those of ordinary skill in the art based on the embodiments of the present disclosure without creative efforts should be within the scope of the present disclosure.

Terms such as "first", "second", and "third" in the specification and claims of the present disclosure and the above drawings are used to distinguish different objects, and are not intended to describe a specific order. Moreover, terms "include" and any variations of the "include" are intended to indicate a non-exclusive inclusion. For example, a process, a method, a system, a product, or a device which includes a series of steps or units is not limited to listed steps or units, but optionally, also includes steps or units not listed, or optionally, also includes other steps or units inherent to these processes, methods, products, or equipment.

Figure 1:
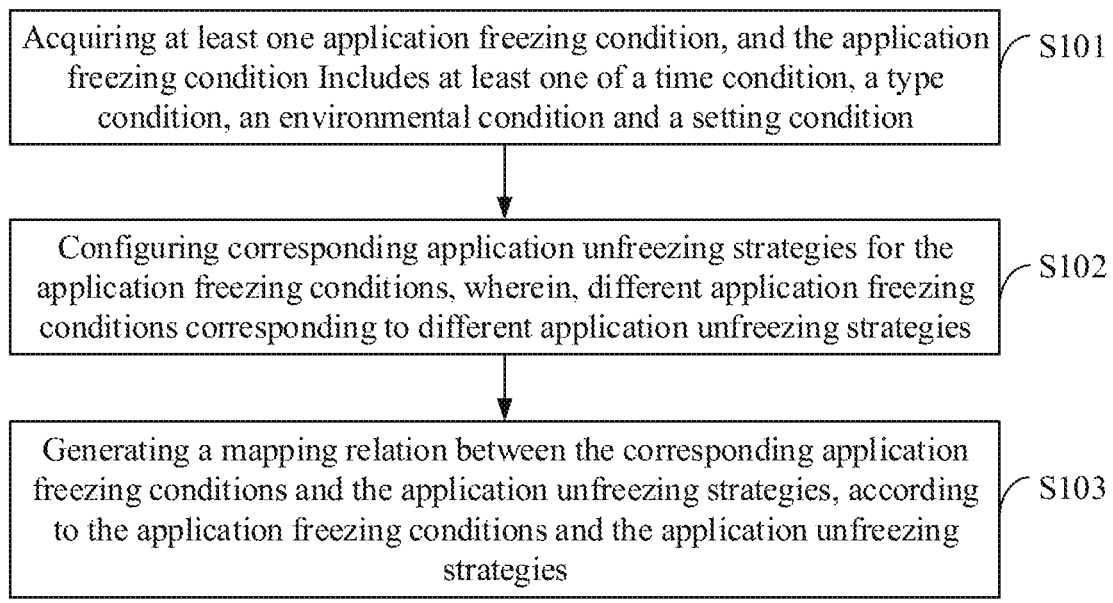
FIG. 1 shows a schematic flow chart of an embodiment of an application freezing management method according to the present disclosure.

FIG. 1 shows a schematic flow chart of an embodiment of an application freezing management method according to the present disclosure. The embodiment of the application freezing management method provided by the present disclosure can be applied to a terminal with a communication network function, such as a smart phone, a tablet computer, or a smart wearable device, and can be implemented by a processor of the terminal. The embodiment of the application freezing management method provided by the present disclosure can include the following steps.

S101, acquiring at least one application freezing condition, and the application freezing condition includes at least one of a time condition, a type condition, an environmental condition and a setting condition.

In an embodiment of the present disclosure, an user/system can customize some application freezing conditions for determining whether to freezing application in the terminal previously. These application freezing conditions can include human setting conditions and non-human setting conditions. The human setting conditions refers to the application freezing conditions that the user adds in the terminal according to actual needs/likes. The non-human setting conditions can include application freezing conditions that is existed in the terminal system or self-owned by the terminal system, such as time conditions, environmental location conditions (that is, the environmental conditions), application type conditions (that is, the type conditions) and the like. Optionally, for the time conditions, different time conditions can be set according to actual time when the user did not use the application. For the environmental location conditions (that is, the environmental conditions), it can be classified to obtain different environmental location conditions (that is, environmental conditions), according to classification standards customized by the user/system in the terminal previously, such as indoor and outdoor environments, trusted environments and untrusted environments after the terminal is connected to the network. For the application type conditions, the user/system can set/determine applications with a same type or related type having the same application unfreezing manners, that is, having the same application unfreezing strategies. For example, an application APP1 and an application APP2 are in a same game type application, and when an application unfreezing manner (that is, an application unfreezing strategy) is already set to the APP1, then the APP2 and the APP1 have the same unfreezing manners (that is, application unfreezing strategies) as the APP2 and the APP1 are in the same type. The terminal can detect and acquire all or part of application freezing conditions that are customized by the user/system in the terminal previously, and the application freezing condition can include one or more of the time condition, the type condition, the environment condition, and the setting condition (here mainly refers to the human setting condition).

Optionally, the user/system can also set the corresponding condition priorities for the application freezing conditions. Exemplarily, it is assumed that the terminal has pre-stored the time condition (that is, the time), and the environmental condition (that is, the environmental location) and the setting condition. Here, it can refer to the application freezing condition of the human setting application APP in the human setting condition. The priorities set by the user for the above four application freezing conditions can be: time<environmental location<human setting APP, it can be known that time (that is, the time condition) has the lowest priority, followed by the environmental location (that is, the environment condition), and the highest priority is the human setting APP (that is, the setting condition). Among them, according to the time, it can be divided into APP frozen for a short-time unused and APP frozen for a long-time unused. The short time and the long time are divided according to a period/interval in which the user uses the application. For an application APP, the usage time of the application by the user is within a preset first time range (e.g., 2 days to 7 days) that the user/system customizes in the terminal previously, it is considered that the application APP is not used for the short time. When the usage time of the application by the user is greater than or equal to a maximum time threshold in the preset first time range (if the preset first time range is 2 to 7 days as mentioned above, the maximum time threshold here refers to 7 days), it is considered that the application APP is not used for the long time. Or, for example, the short time unused can be unused the application for more than 1 week and the long time unused can be unused the application for more than 3 months, here, the user/system can set the priority of the short time to be lower than the long time. The environmental location can be divided into indoor and outdoor, where a distinction between the indoor and the outdoor environmental location, the terminal can distinguish by invoking global positioning system GPS (GPS) of the terminal itself or the other terminals through the network, or turning on the networking function (such as turning on Wi-Fi or card data flow), the user/system can freely/customize the priority of the indoor to be lower than the outdoor.

The terminal can include an Internet device such as a smart mobile phone (e.g. an ANDROID™ mobile phone, an IOS™ mobile phone, etc.), a personal computer, a tablet computer, a palmtop computer, a mobile Internet device (MID) or wearable smart equipment, the embodiments of the present disclosure are not limited.

S102, configuring corresponding application unfreezing strategies for the application freezing conditions, different application freezing conditions corresponding to different application unfreezing strategies.

In the embodiment of the present disclosure, the terminal can also configure corresponding application unfreezing strategies for the application freezing conditions acquired in S101, different application freezing conditions corresponding to different application unfreezing strategies.

Optionally, configuring corresponding application unfreezing strategies for the application freezing conditions, includes:

Configuring at least one corresponding application unfreezing password for each condition of the application freezing conditions, the application unfreezing password including at least one of a character unfreezing password, an image unfreezing password and a voice unfreezing password;

Arranging and combining the application unfreezing passwords to obtain the application unfreezing strategies corresponding to the application freezing conditions, according to preset password priorities and combined logic relations.

The terminal can configure corresponding application unfreezing password for each condition of the application freezing conditions acquired in S101, the each condition of the application freezing conditions can correspond to one or more application unfreezing passwords, and the application unfreezing passwords corresponding to the each condition can be the same or different, the embodiments of the present disclosure are not limited. Optionally, the user/system can customize some application freezing passwords such as fingerprint unfreezing passwords that are unfrozen with fingerprint recognition, or digital unfreezing passwords that are unfrozen by inputting the digitally, or Sudoku unfreezing passwords that are unfrozen by painting the Sudoku, or voice unfreezing passwords corresponding languages that are unfrozen by speaking voice recognition, or face image passwords that are unfroze by scanning face features and the like, in the terminal previously. When the terminal detects that the one or more application unfreezing passwords need to be configured for the each condition of the application freezing conditions acquired in S101, the terminal can select corresponding application unfreezing passwords from the application unfreezing passwords preset by the user/system, and associate the selected application unfreezing passwords with the application freezing conditions. Alternatively, the terminal can detect and acquire corresponding one or more application unfreezing passwords for the each condition of the application freezing conditions configured by the user in the terminal previously.

Moreover, the user/system can customize password priorities corresponding to the application unfreezing passwords in the terminal previously. For example, it is assumed that application unfreezing passwords selected by the user to be used, includes three types of application unfreezing passwords, such as a fingerprint, a digital password and voice, and the password priorities (that is, importance of the passwords) of the three types of application unfreezing passwords are the fingerprint<digital password<voice. That is, the priority of the voice is the highest, the priority of the fingerprint is the lowest; the priority of the digital password is medium.

Moreover, the user/system can customize corresponding combination logical relationship for the application unfreezing passwords in the terminal previously, namely, each application unfreezing password is logically combined with "and", "or", such as "fingerprint or digital password", "digital password", "fingerprint and digital password", "digital password and voice".

Optionally, the terminal can also arrange all or part of the application unfreezing passwords for each condition of the application freezing conditions in step S101 as described above, according to the password priorities and the combined logical relationships preset by the user/system, and combine to finally obtain application unfreezing strategies corresponding to the application freezing conditions according to the combined logical relationships. Alternatively, the user/system can customize some application unfreezing strategies (namely, application unfreezing manners) in the terminal previously. These application unfreezing strategies can include application unfreezing strategies formed by one or more combinations, such as image passwords including fingerprint passwords, face recognition images and two-dimensional codes, voice passwords, and character passwords including digital passwords and Sudoku. The terminal can associate the application unfreezing strategies with the application freezing conditions obtained in step S101. That is, the terminal can configure/allocate the corresponding application unfreezing strategies for the application freezing condition acquired in S101, in which, different application freezing conditions corresponding to different application unfreezing strategies. That is, each application freezing condition has an application unfreezing strategy, and the same application unfreezing strategy can have one or more different application freezing conditions, and the embodiment of the present disclosure is not limited. The application unfreezing strategies can include application unfreezing strategies formed by one or more combinations, such as the fingerprint passwords, the face recognition images, the two-dimensional codes, the voice passwords, the digital passwords, the Sudoku, the image passwords, and the character passwords.

Optionally, the terminal can further determine unfreezing sequences of the corresponding application unfreezing passwords according to the preset password priorities, such as arranging and unfreezing according to the priorities from high to low. For example, the application unfreezing strategies are "fingerprint and digital password", when the application is unfroze freezing according to the application unfreezing strategies, the fingerprint needs to be pressed firstly, and then the digital password is input. When the fingerprint and the digital password are successfully verified, the application is allowed to be unfroze.

Exemplarily, it is assumed that the application freezing conditions obtained in S101 include five, respectively: short-time+indoor, short-time+outdoor, long-time+indoor, long-time+outdoor, and human setting APP. Referring to the password priorities of the application unfreezing passwords as described above, fingerprint<digital password<voice, and the preset combined logical relationship between each application unfreezing password is "AND" and "OR", then the terminal can customize the corresponding application unfreezing strategies for the five application freezing conditions. Or the terminal can detect and acquire application unfreezing strategies customized by the user/system previously for the above five application freezing conditions. The terminal configures application unfreezing strategies for the five application freezing conditions, according to the application unfreezing strategies customized by the user/system previously for the above five application freezing conditions, and finally the application unfreezing strategies corresponding to the five application freezing conditions of the terminal are "fingerprint or digital password", "digital password", "digital password", "fingerprint and digital password", "digital password and voice". It can be seen from the above that multiple application freezing conditions can correspond to one application unfreezing strategy or multiple application unfreezing strategies. The two application freezing conditions as above are "short time+outdoor" and "long time+indoor" corresponding to one application unfreezing strategy "number" password". Optionally, the plurality of application freezing conditions can be a same type of application freezing condition, for example, the application freezing condition is a time condition, but a time length or an importance is different, such as the length of time can be time 1<time 2<time 3. That is, time 1 has the shortest time, time 2 is middle and time 3 is the longest.

S103, generating a mapping relation between the corresponding application freezing conditions and the application unfreezing strategies, according to the application freezing conditions and the application unfreezing strategies.

In the embodiment of the present disclosure, the terminal can generate the mapping relation between the corresponding application freezing conditions and the application unfreezing strategies, according to the application unfreezing strategies configured for the application freezing conditions and in step S102. Moreover, the terminal can save the generated mapping relation between the corresponding application freezing conditions and the application unfreezing strategies in the terminal. Exemplarily, referring to the examples in step S102 as described above, the application unfreezing strategies for the five application freezing conditions "short time+indoor, short time+outdoor, long time+indoor, long time+outdoor, human setting APP" are "fingerprint or digital password", "digital Password", "digital Password", "Fingerprint and Digital Password", "Digital Password and Voice" respectively. Then the terminal can generate the mapping relation between each application freezing condition and each application unfreezing strategy according to the application unfreezing strategies, which are a mapping relation between "short-time+indoor" and "fingerprint or digital password", a mapping relation between "short-time+outdoor" and "digital password", a mapping relation between "long-time+indoor" and "digital password", a mapping relation between "long-time+outdoor" and "fingerprint or digital password", a mapping relation between "human setting APP" and "digital password and voice".

Optionally, after generating the mapping relation between the corresponding application freezing conditions and the application unfreezing strategies, according to the application freezing conditions and the application unfreezing strategies, the method further includes:

When receiving an unfreezing instruction for a target application, determining a target freezing condition corresponding to the target application;

Searching for and determining a target unfreezing strategy corresponding to the target freezing condition, according to the generated mapping relation between the application freezing conditions and the application unfreezing strategies;

Unfreezing the frozen target application according to the target unfreezing strategy.

When detecting or receiving an unfreezing instruction for one or more frozen target applications on the terminal from a user or sent by other terminals/servers through a network, the terminal can analyze the unfreezing instruction to determine a target freezing condition corresponding to the frozen target application. Moreover, the terminal finds a target application unfreezing strategy corresponding to the target freezing condition, from the above generated mapping relations between the application freezing conditions and the application unfreezing strategies. Moreover, the terminal can unfreezing the target application according to the application unfreezing strategy. Exemplarily, it is assumed that the target freezing condition corresponding to the target application is "long-time+outdoor", and then, referring to the examples in step S102 as described above, the target application unfreezing strategy corresponding to the target freezing condition "long time+outdoor" is determined to be "a fingerprint and a digital password". The user needs to press the fingerprint firstly, and then input the digital password. After the terminal successfully verifies the above fingerprint and the digital password input by the user, the target application can be unfroze.

Optionally, the application unfreezing strategies can include hiding application unfreezing strategies. For example, if the human setting APP in the application freezing conditions is divided into two categories, such as human setting APP1 and human setting APP2, and the human setting APP1 needs to be hidden (that is, the terminal does not display any application information related to the APP1, such as application icons, application configuration files and the like, to the user for viewing), the human setting APP2 does not need to be hidden (that is, the user can view application information related to the APP2 on the terminal, such as application icons, user information, chat records, etc.). The user can set an application unfreezing strategy of the APP1 that needs to be hidden to be "fingerprint and digital password and voice" (that is, "fingerprint+digital password+voice"). When the user wants to unfreeze the above APP 1 that needs to be hidden, the user can press the fingerprint firstly, input the digital password, and then verify the voice finally according to the application unfreezing strategy "fingerprint+digital password+voice". After the above fingerprint, the digital password and the voice are verified successfully, the application can be unfrozen.

Optionally, after generating a mapping relation between the corresponding application freezing conditions and the application unfreezing strategies, according to the application freezing conditions and the application unfreezing strategies, the method further includes:

receiving a creation request, the creation request being used to request to create a relationship comparison table corresponding to the mapping relation between the application freezing conditions and the application unfreezing strategies;

responding to the creation request, and creating the corresponding relationship comparison table;

arranging the application freezing condition and the application unfreezing strategy according to preset information priorities and displaying in the relationship comparison table.

For convenient viewing by the user, the terminal stores/displays the mapping relation between the application freezing conditions and the application unfreezing strategies in a form of a list/relationship comparison table. That is, the terminal can receive the creation request from the user or sent from other terminals/servers through the network. The creation request is used to request the relationship comparison table corresponding to the mapping relation between the application freezing conditions and the application unfreezing strategies. Moreover, the terminal responds to the creation request, and creates the corresponding relationship comparison table. Further, the terminal can arrange and display the application freezing conditions and the application unfreezing strategies according to the information priority (here, referring to the condition priority and password priority mentioned above) customize by the user/system in the terminal previously, in the relationship comparison table.

Exemplarily, referring to the mentioned above condition priority "time<environmental location<human setting APP", the time is divided into short time and long time, and the short time<long time, the environmental location is divided into an indoor and an outdoor, and the indoor<outdoor. At the same time, referring to the password priority "fingerprint<number password<voice" as described above, the terminal can create a relationship comparison table corresponding to each mapping relationship in step S103, which can be specifically in a relational comparison table as shown in table 1 below.

TABLE 1

| Application freezing conditions | Application unfreezing strategy |
|---|---|
| Short-time + indoor | Fingerprint or digital password |
| Short-time + outdoor | Digital password |
| Long-time + indoor | Digital password |
| Long-time + outdoor | Fingerprint and digital password |
| Human setting APP | Digital password and voice |

Optionally, the method further includes:

Updating or regenerating the mapping relation between the application freezing conditions and the application unfreezing strategies, when the application freezing conditions are detected or the application unfreezing strategies change.

When the terminal detects that one or more of the application freezing conditions, the application unfreezing strategies and the password priorities, and the combined logical relationship are changed (e.g., the user can perform operations such as adding, deleting, modifying, etc., for each condition of the application freezing conditions), the terminal can refine the generated mapping relation between the application freezing conditions and the application unfreezing strategies, or the terminal can regenerate a corresponding mapping relation between the application freezing conditions and the application unfreezing strategies according to the changed application freezing conditions and the changed application unfreezing strategies.

Exemplarily, the application unfreezing strategies can be changed, such as increasing/deleting each application unfreezing password in the application unfreezing strategies, or changing the password priorities of the application unfreezing passwords in the application unfreezing strategies. Referring to the relationship comparison table corresponding to the mapping relation between the application freezing conditions and the application unfreezing strategies as provided in table 1 above. If the "voice" in the application unfreezing password "fingerprint and the digital password" is deleted, then, since the priority of the fingerprints is higher than the digital passwords, the application unfreezing strategy of "human setting APP" will become "fingerprint and a digital password", specifically as shown in table 2 below.

TABLE 2

| Application freezing conditions | Application unfreezing strategy |
|---|---|
| Short-time + indoor | Fingerprint or digital password |
| Short-time + outdoor | Digital password |
| Long-time + indoor | Digital password |
| Long-time + outdoor | Fingerprint and digital password |
| Human setting APP | Fingerprint and digital password |

Referring to the relationship comparison table corresponding to the mapping relation between the application freezing conditions and the application unfreezing strategies as given in table 1 above, the password priority between each application unfreezing password can be changed, such as changing the original password priority from "fingerprint<number password<voice" to "digital password<fingerprint<voice", then the relationship comparison table as given in table 1 above will become as shown in table 3 below.

TABLE 3

| Application freezing conditions | Application unfreezing strategy |
|---|---|
| Short-time + indoor | Fingerprint or digital password |
| Short-time + outdoor | Fingerprint |
| Long-time + indoor | Fingerprint |
| Long-time + outdoor | digital password and Fingerprint |
| Human setting APP | Fingerprint and voice |

Referring to the relationship comparison table corresponding to the mapping relation between the application freezing conditions and the application unfreezing strategies as given in table 1 above, the application unfreezing passwords constituting the application unfreezing strategy can be increased, such as increasing the Sudoku in the application freezing condition "short time", and the combination logical relationship with other application unfreezing passwords is "or", then the relationship comparison table given in table 1 above will become as shown in table 7 below.

TABLE 4

| Application freezing conditions | Application unfreezing strategy |
|---|---|
| Short-time + indoor | Sudoku or fingerprint or digital password |
| Short-time + outdoor | Digital password |
| Long-time + indoor | Digital password |
| Long-time + outdoor | Fingerprint and digital password |
| Human setting APP | Digital password and voice |

Illustratively, if the application freezing conditions are changed, and each condition of the application freezing conditions can be added/deleted, or the condition priorities of each condition of the application freezing conditions can be changed. Referring to the relationship comparison table corresponding to the mapping relation between the application freezing conditions and the application unfreezing strategies as given in table 1 above, if the "environmental location" in the application freezing conditions "time, environmental location, artificial setting APP" is deleted, the terminal can re-configure corresponding application unfreezing strategies for the other application freezing conditions "time, human setting APP", or the terminal can send prompt information, and the prompt information is used to prompt the user to configure an corresponding application unfreezing strategies for the other application freezing conditions "time, human setting APP" independently. The details are shown in table 5 below. Optionally, the terminal can also detect and acquire usage frequencies of each application unfreezing strategy or usage frequencies of the application unfreezing passwords in the application unfreezing strategies used by the users or the terminal itself, to determine application unfreezing strategies corresponding to changed application freezing conditions. For example, it can be seen from the above table 1 that, "fingerprint or digital password" is more used for a short-term, "digital password" is more used for a long-term, then after deleting "environmental location", the configured application unfreezing strategy for the remaining application freezing condition "short-time" is "fingerprint or digital password", and for the "long-time" is "digital password".

TABLE 5

| Application freezing conditions | Application unfreezing strategy |
|---|---|
| Short-time | Fingerprint or digital password |
| Long-time | Fingerprint and digital password |
| Human setting APP | Digital password and voice |

Referring to the relationship comparison table corresponding to the mapping relation between the application freezing conditions and the application unfreezing strategies as given in table 1 above, if condition of the application freezing conditions are increased, such as increasing the APP type and the condition priority of the APP type is after the "human setting APP", then the terminal can configure an application freezing condition corresponding to the newly-added application freezing condition "APP type", or, the terminal can send the prompt information, and the prompt information is used to prompt the user to configure a corresponding application unfreezing strategy for the newly-added application freezing condition "APP type" independently. The details are shown in table 6 below. Optionally, the terminal can also detect and acquire a usage frequency of each application unfreezing strategy or usage frequencies of the application unfreezing passwords in the application unfreezing strategies used by the users or the terminal itself, to determine application unfreezing strategies corresponding to changed application freezing conditions.

TABLE 6

| Application freezing conditions | Application unfreezing strategy |
|---|---|
| Short-time + indoor | Fingerprint or digital password |
| Short-time + outdoor | Digital password |
| Long-time + indoor | Digital password |
| Long-time + outdoor | Fingerprint and digital password |
| APP style | Fingerprint and digital password |
| Human setting APP | Digital password and voice |

Referring to the relationship comparison table corresponding to the mapping relation between the application freezing conditions and the application unfreezing strategies as given in table 1 above, if the condition priorities of conditions in the application freezing conditions are increased, for example, the original condition priority "time<environmental location<human setting APP" is changed to "environmental location<time<human setting APP", then the relationship comparison table given in table 1 above will become to be shown in table 7 below.

TABLE 7

| Application freezing conditions | Application unfreezing strategy |
|---|---|
| Short-time + indoor | Fingerprint or digital password |
| Long-time + indoor | Digital password |
| Short-time + outdoor | Digital password |
| Long-time + outdoor | Fingerprint and digital password |
| Human setting APP | Digital password and voice |

Referring to the relationship comparison table corresponding to the mapping relation between the application freezing conditions and the application unfreezing strategies as given in table 1 above, if the terminal detects/receives a relationship change instruction sent by the user or other terminals/servers through a network, the relationship change instruction is used to indicate to modify/change the mapping relation between the application freezing conditions and the application unfreezing strategies, then the terminal can respond to the relationship change instruction to modify/change the mapping relation between the application freezing conditions and the application unfreezing strategies. If the user feels that the application unfreezing strategies corresponding to the "long time+outdoor" is too troublesome, the user can reduce the complexity/importance of the application unfreezing strategies, and can modify it to "fingerprint or digital password" or "fingerprint". Similarly, if the user feels that the application unfreezing strategies corresponding to the application freezing conditions are not secure enough, the user can also enhance the complexity/importance of the corresponding application unfreezing strategies, and can modify it to other more advanced importance application unfreezing strategies such as "fingerprint and digital password and voice".

The embodiments of the present disclosure can acquire at least one application freezing condition by using the terminal, and the application freezing condition including at least one of a time condition, a type condition, an environmental condition and a setting condition; configure corresponding application unfreezing strategies for the application freezing conditions, different application freezing conditions corresponding to different application unfreezing strategies. In the end, the embodiments of the present disclosure can generate a mapping relation between the corresponding application freezing conditions and the application unfreezing strategies, according to the application freezing conditions and the application unfreezing strategies. In this way, different application unfreezing strategies can be configured for different application freezing conditions according to actual requirements of user, the user's individualized requirements can be satisfied, diversities of the application unfreezing strategies and practicality of the application freezing management are improved, and user experience is improved.

Figure 2:
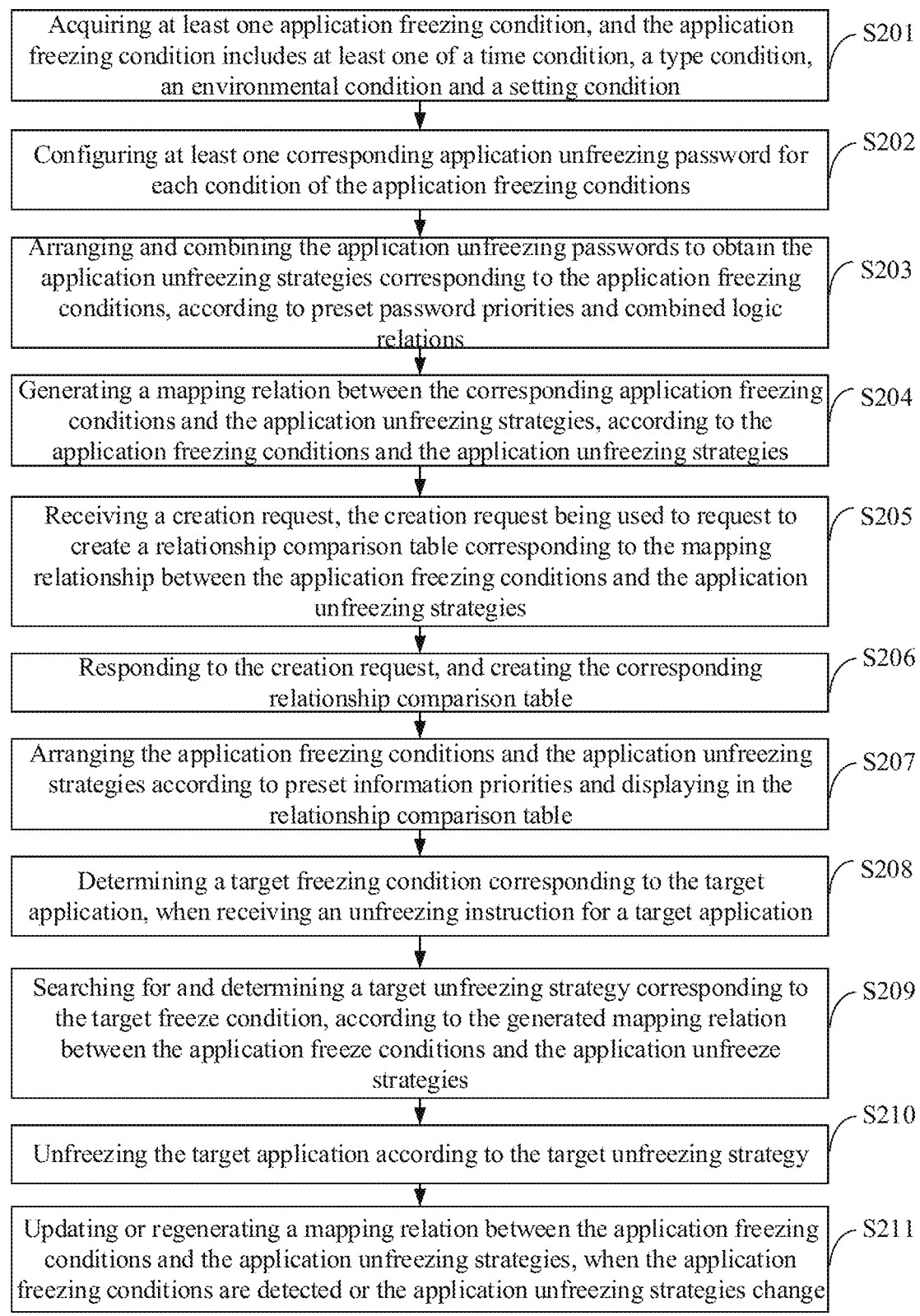
FIG. 2 shows a schematic flow chart of another embodiment of an application freezing management method according to the present disclosure.

FIG. 2 shows a schematic flow chart of another embodiment of an application freezing management method according to the present disclosure. The embodiment of the application freezing management method provided by the present disclosure can include the following steps:

S201, acquiring at least one application freezing condition, and the application freezing condition includes at least one of a time condition, a type condition, an environmental condition and a setting condition.

S202, configuring at least one corresponding application unfreezing password for each condition of the application freezing conditions, the application unfreezing password including at least one of a character unfreezing password, an image unfreezing password and a voice unfreezing password.

S203, arranging and combining the application unfreezing passwords to obtain the application unfreezing strategies corresponding to the application freezing conditions, according to preset password priorities and combined logic relations.

S204, generating a mapping relation between the corresponding application freezing conditions and the application unfreezing strategies, according to the application freezing conditions and the application unfreezing strategies.

S205, receiving a creation request, the creation request being used to request to create a relationship comparison table corresponding to the mapping relation between the application freezing conditions and the application unfreezing strategies.

S206, responding to the creation request, and creating the corresponding relationship comparison table.

S207, arranging the application freezing conditions and the application unfreezing strategies according to preset information priorities and displaying in the relationship comparison table.

S208, determining a target freezing condition corresponding to the target application, when receiving an unfreezing instruction for a target application.

S209, searching for and determining a target unfreezing strategy corresponding to the target freezing condition, according to the generated mapping relation between the application freezing conditions and the application unfreezing strategies.

S210, unfreezing the target application according to the target unfreezing strategy.

It should be noted that, the above described steps S208 to S210 can also be performed in sequence after the step S204, the sequence is not limited in the embodiment of the present disclosure.

S211, Updating or regenerating the mapping relation between the application freezing conditions and the application unfreezing strategies, when the application freezing conditions are detected or the application unfreezing strategies change.

It should be noted that, the step S211 can be performed after any one of the steps S204, S207, and S211, which is not limited in the embodiment of the present disclosure.

The embodiments of the present disclosure can acquire at least one application freezing condition by using the terminal, and the application freezing condition including at least one of a time condition, a type condition, an environmental condition and a setting condition; configure corresponding application unfreezing strategies for the application freezing conditions, different application freezing conditions corresponding to different application unfreezing strategies. In the end, the embodiments of the present disclosure can generate a mapping relation between the corresponding application freezing conditions and the application unfreezing strategies, according to the application freezing conditions and the application unfreezing strategies. In this way, different application unfreezing strategies can be configured for different application freezing conditions according to actual requirements of user, the user's individualized requirements can be satisfied, diversities of the application unfreezing strategies and practicality of the application freezing management are improved, and user experience is improved.

Figure 3:
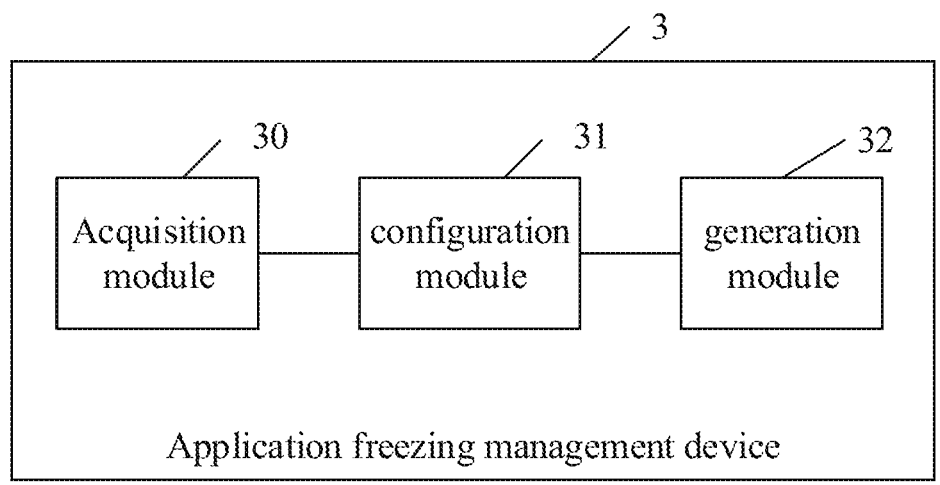
FIG. 3 shows a schematic structural diagram of an embodiment of an application freezing management device according to the present disclosure.

FIG. 3 shows a schematic structural diagram of an embodiment of an application freezing management device according to the present disclosure. The embodiment of the application freezing management device provided by the present disclosure can be installed in a terminal with a communication network function, such as a smart phone, a tablet computer, or a smart wearable device, and can be implemented by a processor of the terminal. An application freezing management device 3 can include:

An acquisition module 30, is configured to acquire at least one application freezing condition, and the application freezing condition including at least one of a time condition, a type condition, an environmental condition and a setting condition;

A configuration module 31, is configured to configure corresponding application unfreezing strategies for the application freezing conditions, different application freezing conditions corresponding to different application unfreezing strategies;

A generation module 32, is configured to generate a mapping relation between the corresponding application freezing conditions and the application unfreezing strategies, according to the application freezing conditions and the application unfreezing strategies.

Specific implementations of the various modules involved in the embodiments of the present disclosure, can refer to the description of related functional modules or implementation steps in the corresponding embodiments of FIG. 1 to FIG. 2, and it is not repeated herein.

The embodiments of the present disclosure can through the terminal to acquire at least one application freezing condition, and the application freezing condition includes at least one of a time condition, a type condition, an environmental condition and a setting condition. Then configure corresponding application unfreezing strategies for the application freezing conditions, different application freezing conditions corresponding to different application unfreezing strategies. In the end, generate a mapping relation between the corresponding application freezing conditions and the application unfreezing strategies, according to the application freezing conditions and the application unfreezing strategies. In this way, different application unfreezing strategies can be configured for different application freezing conditions according to actual needs of user, the user's individualized requirements can be satisfied, diversities of the application unfreezing strategies and practicality of the application freezing management are improved, and user experience is improved.

Figure 4:
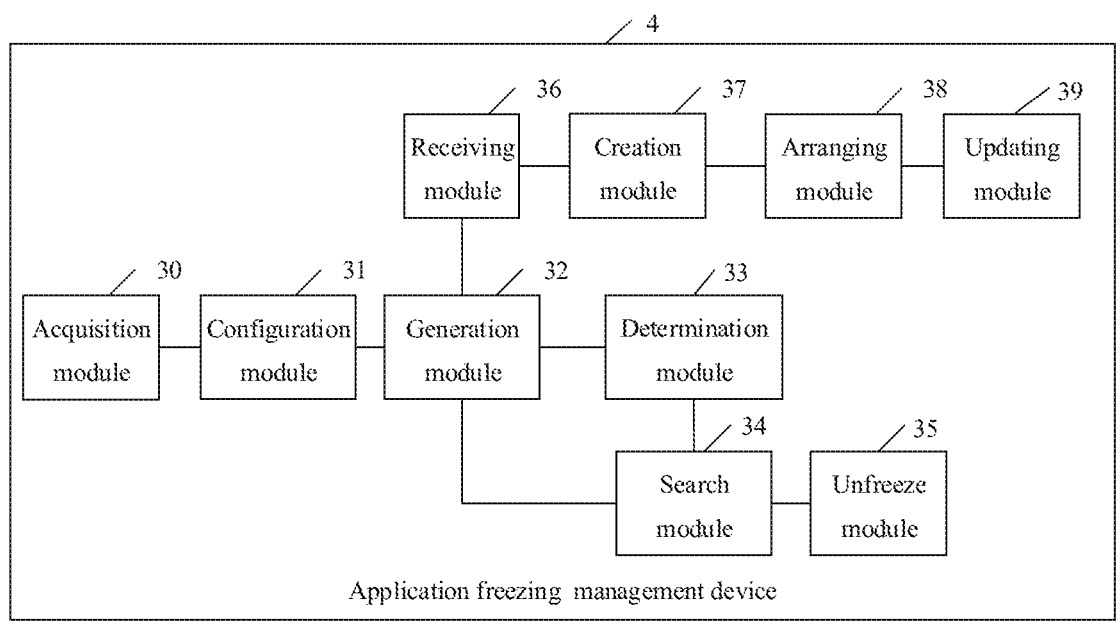
FIG. 4 shows a schematic structural diagram of another embodiment of an application freezing management device according to the present disclosure.

FIG. 4 shows a schematic structural diagram of another embodiment of an application freezing management device according to the present disclosure. The application freezing management device can include the acquisition module 30, the configuration module 31 and the generation module 32, the device also includes:

A determination module 33, is configured to determine a target freezing condition corresponding to the target application, when receiving an unfreezing instruction for a target application;

A search module 34, is configured to search for and determine a target unfreezing strategy corresponding to the target freezing condition, according to the mapping relation between the application freezing conditions and the application unfreezing strategies generated by the generation module 32;

An unfreezing module 35, is configured to unfreeze the target application according to the target unfreezing strategy.

Optionally,

The configuration module 31, is specially configured to configure at least one corresponding application unfreezing password for each condition of the application freezing conditions, wherein, the application unfreezing password comprises at least one of a character unfreezing password, an image unfreezing password and a voice unfreezing password; arrange and combine the application unfreezing passwords according to preset password priorities and combined logic relations, to obtain the application unfreezing strategies corresponding to the application freezing conditions.

Optionally, the device also includes:

A receiving module 36, is configured to receive a creation request, the creation request being used to request to create a relationship comparison table corresponding to the mapping relation between the application freezing conditions and the application unfreezing strategies;

A creation module 37, is configured to respond to the creation request, and create the corresponding relationship comparison table;

An arranging module 38, is configured to arrange the application freezing condition and the application unfreezing strategy according to preset information priorities and displaying in the relationship comparison table.

Optionally, the device also includes:

An updating module 39, is configured to update or regenerate the mapping relation between the application freezing conditions and the application unfreezing strategies, when the application freezing conditions are detected or the application unfreezing strategies change.

Specific implementations of the various modules involved in the embodiments of the present disclosure, can refer to the description of related functional modules or implementation steps in the corresponding embodiments of FIG. 1 to FIG. 2, and it is not repeated herein.

The embodiments of the present disclosure can acquire at least one application freezing condition by using the terminal, and the application freezing condition including at least one of a time condition, a type condition, an environmental condition and a setting condition; configure corresponding application unfreezing strategies for the application freezing conditions, different application freezing conditions corresponding to different application unfreezing strategies. In the end, the embodiments of the present disclosure can generate a mapping relation between the corresponding application freezing conditions and the application unfreezing strategies, according to the application freezing conditions and the application unfreezing strategies. In this way, different application unfreezing strategies can be configured for different application freezing conditions according to actual requirements of user, the user's individualized requirements can be satisfied, diversities of the application unfreezing strategies and practicality of the application freezing management are improved, and user experience is improved.

Figure 5:
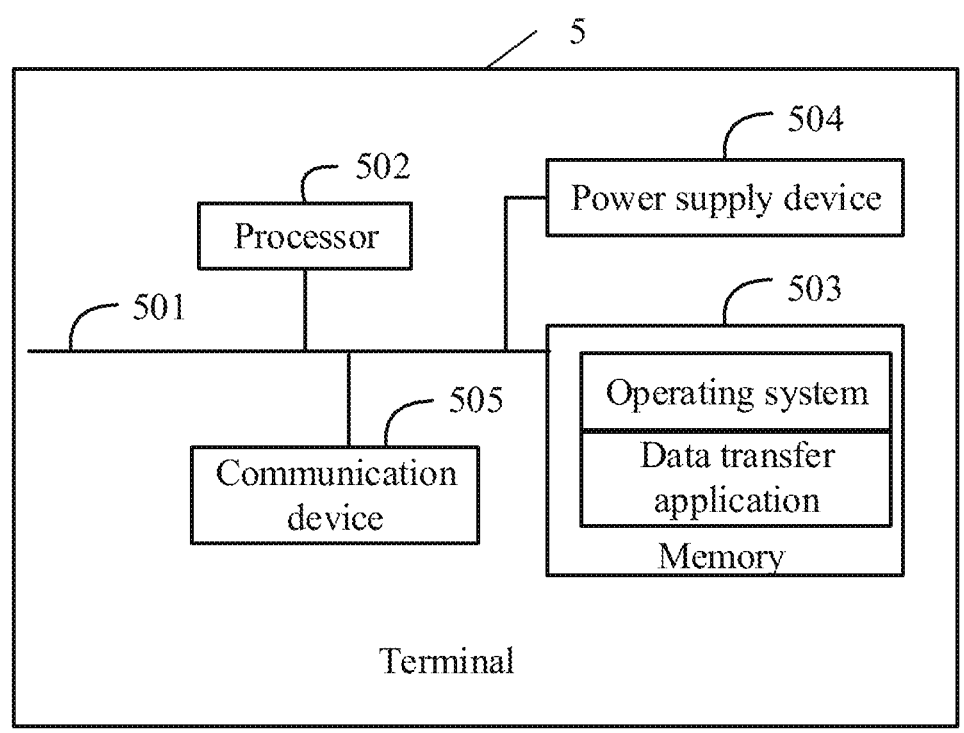
FIG. 5 shows a schematic structural diagram of an embodiment of a terminal according to the present disclosure.

FIG. 5 shows a schematic structural diagram of an embodiment of a terminal according to the present disclosure. The terminal can be equipment with a communication network function, such as a smart phone, a tablet computer, or a smart wearable device. As show in FIG. 5, the embodiment of the terminal according to the present disclosure can include a display screen, a button, a speaker, a pickup, and the like, and further includes: at least one communication bus 501, at least one processor 502 connected to the communication bus 501, at least one memory 503 connected to the communication bus 501, a communication device 505 for implementing a communication function, and a power supply device 504 that supplies power to each power consumption module of the terminal.

The processor 502 can invoke the program codes stored in the memory 503 to perform corresponding functions through the communication bus 501, wherein the memory 503 includes an operating system, a data transfer application.

The processor 502 can execute an operating system and various installed application programs, program codes of the terminal 5, etc., for example, each of the various modules as mentioned above, which includes the acquisition module 30, the configuration module 31, the generation module 32, the determination module 33, the search module 34, the unfreezing module 35, the receiving module 36, the creation module 37, the arranging module 38, and the updating module 39, etc.

The memory 503 stores program codes, and the processor 502 can invoke the program codes stored in the memory 503 to perform corresponding functions through the communication bus 501. For example, each of the various units in FIG. 3 and FIG. 4 (e.g., the acquisition module 30, the configuration module 31, the generation module 32, the determination module 33, the search module 34, the unfreezing module 35, the receiving module 36, the creation module 37, the arranging module 38, and the updating module 39, etc.) is program codes stored in the memory 414 and executed by the processor 410, so as to perform the functions of each unit to realize the management of application freezing.

The processor 502, is used to acquire at least one application freezing condition, and the application freezing condition includes at least one of a time condition, a type condition, an environmental condition and a setting condition; configure corresponding application unfreezing strategies for the application freezing conditions, different application freezing conditions corresponding to different application unfreezing strategies; generate a mapping relation between the corresponding application freezing conditions and the application unfreezing strategies, according to the application freezing conditions and the application unfreezing strategies.

Further optionally, the processor 502, is also used to determine a target freezing condition corresponding to the target application, when receiving an unfreezing instruction for a target application; search for and determine a target unfreezing strategy corresponding to the target freezing condition, according to the generated mapping relation between the application freezing conditions and the application unfreezing strategies; unfreezing the target application according to the target unfreezing strategy.

Further optionally, the processor 502, is also used to configure at least one corresponding application unfreezing password for each condition of the application freezing conditions, wherein, the application unfreezing password comprises at least one of a character unfreezing password, an image unfreezing password and a voice unfreezing password; arrange and combine the application unfreezing passwords according to preset password priorities and combined logic relations, to obtain the application unfreezing strategies corresponding to the application freezing conditions.

Further optionally, the processor 502, is also used to receive a creation request, the creation request being used to request to create a relationship comparison table corresponding to the mapping relation between the application freezing conditions and the application unfreezing strategies; respond to the creation request, and create the corresponding relationship comparison table; arrange the application freezing condition and the application unfreezing strategy according to preset information priorities and displaying in the relationship comparison table.

Further optionally, the processor 502, is also used to update or regenerate the mapping relation between the application freezing conditions and the application unfreezing strategies, when the application freezing conditions are detected or the application unfreezing strategies change.

Specific implementations of the various modules involved in the embodiments of the present disclosure, can refer to the description of related functional modules or implementation steps in the corresponding embodiments of FIG. 1 to FIG. 2, and it is not repeated herein.

Specifically, specific implementation method of the instruction performed by the processor 502 can refer to the relevant steps in the corresponding embodiments of FIG. 1 and FIG. 2, and it is not repeated herein.

The embodiments of the present disclosure can acquire at least one application freezing condition by using the terminal, and the application freezing condition including at least one of a time condition, a type condition, an environmental condition and a setting condition; configure corresponding application unfreezing strategies for the application freezing conditions, different application freezing conditions corresponding to different application unfreezing strategies. In the end, the embodiments of the present disclosure can generate a mapping relation between the corresponding application freezing conditions and the application unfreezing strategies, according to the application freezing conditions and the application unfreezing strategies. In this way, different application unfreezing strategies can be configured for different application freezing conditions according to actual requirements of user, the user's individualized requirements can be satisfied, diversities of the application unfreezing strategies and practicality of the application freezing management are improved, and user experience is improved.

The embodiment of the present disclosure further provides a computer storage medium, and the computer storage medium store a program that performs all or part of the steps including any of the application freezing and unfreezing operation method described in the above embodiments.

It should be noted that, for a simple description, the above method embodiments expressed as a series of action combinations, but those skilled in the art should understand that the present disclosure is not limited by the described action sequence. According to the present disclosure, some steps in the above embodiments can be performed in other sequences or simultaneously. Secondly, those skilled in the art should also understand that the embodiments described in the specification are all optional embodiments, and the actions and units involved are not necessarily required by the present disclosure.

In the above embodiments, descriptions of each embodiment has different focuses, and when there is no detail part in a certain embodiment, please refer to relevant parts of other embodiments.

In several embodiments provided in the presetting application, it should be understood that the disclosed apparatus can be implemented in other ways. For example, the device embodiments described above are merely illustrative. For example, divisions of the unit are only a logical function division, and there can be other division ways in actual implementation. For example, multiple units or components can be combined or can be integrated into another system, or some features can be ignored or not executed. In addition, a mutual coupling or a direct coupling or communication connection shown or discussed can be an indirect coupling or communication connection through some interfaces, devices or units, and can be electrical or other forms.

The units described as separate components can or cannot be physically separated, and the components displayed as units can or cannot be physical units. That is, it can locate in one place, or distribute to multiple network units. Some or all of the units can be selected according to actual needs to achieve the purpose of the solution of above embodiments.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

When an integrated unit implemented in the form of a software functional unit and sold or used as a standalone product, it can be stored in a computer readable storage medium. Based on this, the technical solutions of the present disclosure, or parts that contribute to an existing technology, or all or part of the technical solution can be embodied in a form of a software product. The computer software product stored in a storage medium, and the computer software product includes instructions for a computer device to perform all or part of the steps of the method described in various embodiments of the present disclosure.

The above embodiments are only used to illustrate technical solutions of the present disclosure, rather than restrictions on the technical solutions. Although the present disclosure has been described in detail with reference to the above embodiments, those skilled in the art should understand that the technical solutions described in one embodiments can be modified, or some of technical features can be equivalently substituted, and these modifications or substitutions do not detract from the essence of the corresponding technical solutions from the scope of the technical solutions of the embodiments of the present disclosure.

I claim:

1. An application freezing management method, executed in a terminal, the method comprising:
   acquiring at least one application freezing condition, and the application freezing condition comprising at least one of a time condition, a type condition, an environmental condition and a setting condition, wherein the environmental condition are classified according to classification standards customized by a user or a system in the terminal, as the environmental condition comprises indoor and outdoor environments, trusted environments and untrusted environments after the terminal is connected to the network;
   configuring corresponding application unfreezing strategies for the application freezing conditions, comprising: configuring at least one corresponding application unfreezing password for each condition of the application freezing conditions, the application unfreezing password comprising at least one of a character unfreezing password, an image unfreezing password and a voice unfreezing password; arranging and combining the application unfreezing passwords to obtain the application unfreezing strategies corresponding to the application freezing conditions, according to preset password priorities and combined logic relations, different application freezing conditions corresponding to different application unfreezing strategies;
   generating a mapping relation between the corresponding application freezing conditions and the application unfreezing strategies, according to the application freezing conditions and the application unfreezing strategies.

2. The method of claim 1, after generating the mapping relation between the corresponding application freezing conditions and the application unfreezing strategies, according to the application freezing conditions and the application unfreezing strategies, further comprising:
   when receiving an unfreezing instruction for a target application, determining a target freezing condition corresponding to the target application;
   searching for and determining a target unfreezing strategy corresponding to the target freezing condition, according to the generated mapping relation between the application freezing conditions and the application unfreezing strategies;
   unfreezing the frozen target application according to the target unfreezing strategy.

3. The method of claim 1, after generating the mapping relation between the corresponding application freezing conditions and the application unfreezing strategies, according to the application freezing conditions and the application unfreezing strategies, further comprising:
   receiving a creation request, the creation request being used to request to create a relationship comparison table corresponding to the mapping relation between the application freezing conditions and the application unfreezing strategies;
   responding to the creation request, and creating the corresponding relationship comparison table;
   arranging the application freezing condition and the application unfreezing strategy according to preset information priorities, and displaying in the relationship comparison table.

4. The method of claim 1, further comprising:
   updating or regenerating the mapping relation between the application freezing conditions and the application unfreezing strategies, when the application freezing conditions are detected or the application unfreezing strategies change.

5. A terminal, comprising:
   at least one processor; and
   a storage device storing a plurality of instructions, which when executed by the at least one processor, causes the at least one processor to:
   acquire at least one application freezing condition, the application freezing condition comprising at least one of a time condition, a type condition, an environmental condition and a setting condition, wherein the environmental condition is classified according to classification standards customized by a user or a system in the terminal, as the environmental condition comprises indoor and outdoor environments, and trusted environments and untrusted environments after the terminal is connected to the network;
   configure corresponding application unfreezing strategies for the application freezing conditions, comprising: configure at least one corresponding application unfreezing password for each condition of the application freezing conditions, the application unfreezing password comprising at least one of a character unfreezing password, an image unfreezing password and a voice unfreezing password; arranging and combining the application unfreezing passwords to obtain the application unfreezing strategies corresponding to the application freezing conditions, according to preset password priorities and combined logic relations, different application freezing conditions corresponding to different application unfreezing strategies;
   generate a mapping relation between the corresponding application freezing conditions and the application unfreezing strategies, according to the application freezing conditions and the application unfreezing strategies.

6. The terminal of claim 5, wherein the plurality of instructions further cause the at least one processor to:
   determine a target freezing condition corresponding to the target application, when receiving an unfreezing instruction for a target application;
   search for and determine a target unfreezing strategy corresponding to the target freezing condition, according to the mapping relation between the application freezing conditions and the application unfreezing strategies generated by the generation module;
   unfreeze the target application according to the target unfreezing strategy.

7. The terminal of claim 5, wherein the plurality of instructions further cause the at least one processor to:

receive a creation request, the creation request being used to request to create a relationship comparison table corresponding to the mapping relation between the application freezing conditions and the application unfreezing strategies;

respond to the creation request, and create the corresponding relationship comparison table;

arrange and display the application freezing conditions and the application unfreezing strategies according to preset information priorities in the relationship comparison table.

8. The terminal of claim 5 wherein the plurality of instructions further cause the at least one processor to:

update or regenerate the mapping relation between the application freezing conditions and the application unfreezing strategies, when the application freezing conditions are detected or the application unfreezing strategies change.

9. The method of claim 1, wherein the time conditions are set to be different according to actual time when the application is not used.

10. The method of claim 1, wherein same type conditions have the same application unfreezing strategies.

11. The terminal of claim 5, wherein the time conditions are set to be different according to actual time when the application is not used.

12. A non-transitory storage medium having stored thereon a plurality of instructions that, when executed by at least one processor of a terminal, causes the processor to perform an application freezing management method using the terminal, the method comprising:

acquiring at least one application freezing condition, and the application freezing condition comprising at least one of a time condition, a type condition, an environmental condition and a setting condition, wherein the environmental condition are classified according to classification standards customized by a user or a system in the terminal, as the environmental condition comprises indoor and outdoor environments, trusted environments and untrusted environments after the terminal is connected to the network;

configuring corresponding application unfreezing strategies for the application freezing conditions, comprising: configuring at least one corresponding application unfreezing password for each condition of the application freezing conditions, the application unfreezing password comprising at least one of a character unfreezing password, an image unfreezing password and a voice unfreezing password; arranging and combining the application unfreezing passwords to obtain the application unfreezing strategies corresponding to the application freezing conditions, according to preset password priorities and combined logic relations, different application freezing conditions corresponding to different application unfreezing strategies;

generating a mapping relation between the corresponding application freezing conditions and the application unfreezing strategies, according to the application freezing conditions and the application unfreezing strategies.

13. The non-transitory storage medium of claim 12, after generating the mapping relation between the corresponding application freezing conditions and the application unfreezing strategies, according to the application freezing conditions and the application unfreezing strategies, wherein the plurality of instructions further causes the at least one processor to:

when receiving an unfreezing instruction for a target application, determining a target freezing condition corresponding to the target application;

searching for and determining a target unfreezing strategy corresponding to the target freezing condition, according to the generated mapping relation between the application freezing conditions and the application unfreezing strategies;

unfreezing the frozen target application according to the target unfreezing strategy.

14. The non-transitory storage medium of claim 12, after generating the mapping relation between the corresponding application freezing conditions and the application unfreezing strategies, according to the application freezing conditions and the application unfreezing strategies, wherein the plurality of instructions further causes the at least one processor to:

receiving a creation request, the creation request being used to request to create a relationship comparison table corresponding to the mapping relation between the application freezing conditions and the application unfreezing strategies;

responding to the creation request, and creating the corresponding relationship comparison table;

arranging the application freezing condition and the application unfreezing strategy according to preset information priorities, and displaying in the relationship comparison table.

15. The non-transitory storage medium of claim 12, wherein the plurality of instructions further causes the at least one processor to:

update or regenerate the mapping relation between the application freezing conditions and the application unfreezing strategies, when the application freezing conditions are detected or the application unfreezing strategies change.

* * * * *